US012287908B2

(12) United States Patent
Ponnuru et al.

(10) Patent No.: US 12,287,908 B2
(45) Date of Patent: Apr. 29, 2025

(54) SYSTEMS AND METHODS TO MANAGE SECURITY PROTOCOL AND DATA MODEL (SPDM) SECURE COMMUNICATION SESSIONS

(71) Applicant: Dell Products, L.P., Round Rock, TX (US)

(72) Inventors: Viswanath Ponnuru, Bangalore (IN); Chandrashekar Nelogal, Round Rock, TX (US); Dharma Bhushan Ramaiah, Bangalore (IN); Vineeth Radhakrishnan, Palakkad (IN); Mini Thottunkal Thankappan, Bangalore (IN); Rama Rao Bisa, Bangalore (IN); Shinose Abdul Rahiman, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 266 days.

(21) Appl. No.: 18/181,721

(22) Filed: Mar. 10, 2023

(65) Prior Publication Data
US 2024/0303381 A1 Sep. 12, 2024

(51) Int. Cl.
H04L 29/06 (2006.01)
G06F 13/40 (2006.01)
G06F 13/42 (2006.01)
G06F 21/85 (2013.01)

(52) U.S. Cl.
CPC .......... G06F 21/85 (2013.01); G06F 13/4027 (2013.01); G06F 13/4282 (2013.01)

(58) Field of Classification Search
CPC ................. G06F 21/577; G06F 21/575; G06F 2221/033; G06F 21/57
See application file for complete search history.

(56) References Cited

U.S. PATENT DOCUMENTS

| | | | |
|---|---|---|---|
| 2016/0142374 A1* | 5/2016 | Clark | H04L 65/1104 726/15 |
| 2020/0099682 A1* | 3/2020 | Alexander | H04L 63/105 |
| 2024/0007286 A1* | 1/2024 | Miyamoto | H04L 9/088 |

* cited by examiner

Primary Examiner — William A Corum, Jr.
(74) Attorney, Agent, or Firm — Fogarty LLP

(57) ABSTRACT

According to embodiments of the present disclosure, systems and methods to manage Security Protocol and Data Model (SPDM) secure communication sessions are provided. According to one embodiment, an Information Handling System (IHS) includes a Security Protocol and Data Model (SPDM)-enabled device conforming to a SPDM specification in which the SPDM-enabled device has a specified quantity of supported private communication sessions. The IHS also includes computer-executable instructions to, when an application requests use of one of the private communication sessions, determine whether one of the private communication sessions is available, and enable the application to communicate with the SPDM-enabled device through the one private communication session based on the determination.

17 Claims, 4 Drawing Sheets

SYSTEMS AND METHODS TO MANAGE SECURITY PROTOCOL AND DATA MODEL (SPDM) SECURE COMMUNICATION SESSIONS

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and high levels of trust provided thereby.

SUMMARY

According to embodiments of the present disclosure, systems and methods to manage Security Protocol and Data Model (SPDM) secure communication sessions are provided. According to one embodiment, an Information Handling System (IHS) includes a Security Protocol and Data Model (SPDM)-enabled device conforming to a SPDM specification in which the SPDM-enabled device has a specified quantity of supported private communication sessions. The IHS also includes computer-executable instructions to, when an application requests use of one of the private communication sessions, determine whether one of the private communication sessions is available, and enable the application to communicate with the SPDM-enabled device through the one private communication session based on the determination.

According to another embodiment, a SPDM secure communication session management method includes the steps of determining whether one of the private communication sessions is available when an application requests use of one of a plurality of private communication sessions supported by a SPDM-enabled device, and enabling the application to communicate with the SPDM-enabled device through the one private communication session based on the determination.

According to yet another embodiment, a computer program product includes a computer readable storage medium having program instructions stored thereon that, upon execution by an Information Handling System (IHS), cause the IHS to determine whether one of the private communication sessions is available when an application requests use of one of a plurality of private communication sessions supported by a Security Protocol and Data Model (SPDM)-enabled device, and enable the application to communicate with the SPDM-enabled device through the one private communication session based on the determination.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
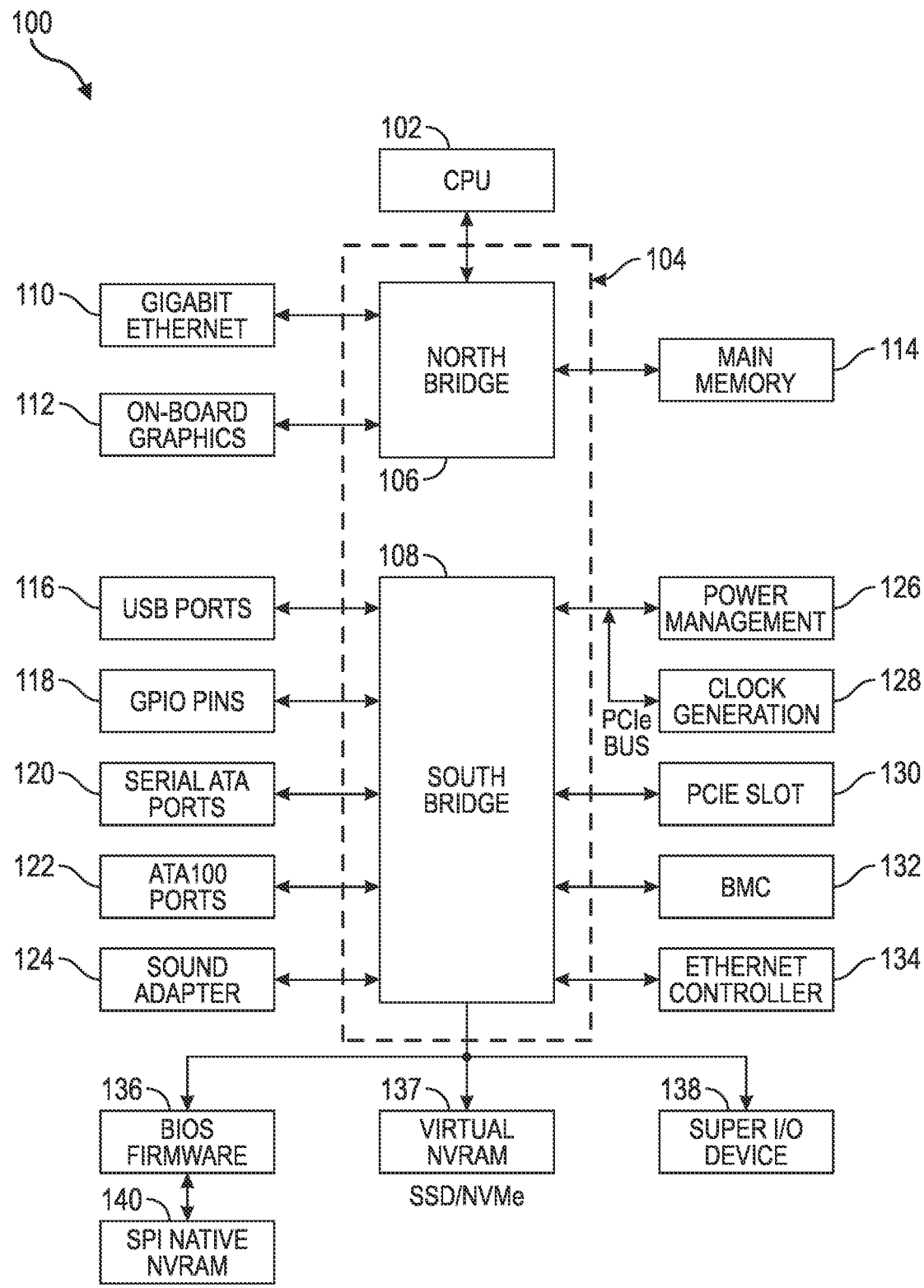
FIG. 1 shows an example of an IHS that may be configured to manage Security Protocol and Data Model (SPDM) secure communication sessions according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with Baseboard Management Controllers (BMCs) that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, support peer-to-peer messaging (e.g., route by ID), and allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

SPDM provides a mechanism to authenticate the server and establish a secure communication session between a requester and a responder for transferring critical data in an encrypted channel. SPDM-enabled devices that support secure communication sessions may support one or more sessions based on its capabilities. For example, the BMC may use a secure communication session to establish an encrypted channel in order to exchange sensitive information for a SEKM key exchange. Conventionally, SPDM does not define any method to manage multiple sessions in which multiple applications within the BMC may require concurrent access to secure sessions with a SPDM-enabled device that supports fewer secure communication sessions than needed by the BMC. Also, there has heretofore existed no technique to identify how many communication sessions are supported by the SPDM-enabled devices during runtime.

According to embodiments of the present disclosure, a system and method to utilize SPDM secure communication sessions is provided that when an application requests use of one of the communication sessions of a SPDM-enabled device, determine whether one of the communication sessions is available, and if so, enable the application to communicate with the SPDM-enabled device through the one communication session based on the determination as will be described in detail herein below.

FIG. 1 shows an example of an IHS 100 that may be configured to manage Security Protocol and Data Model (SPDM) secure communication sessions according to one embodiment of the present disclosure. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by south bridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more SPDM-enabled devices 202 configured in the IHS 100. The SPDM-enabled device 202 may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
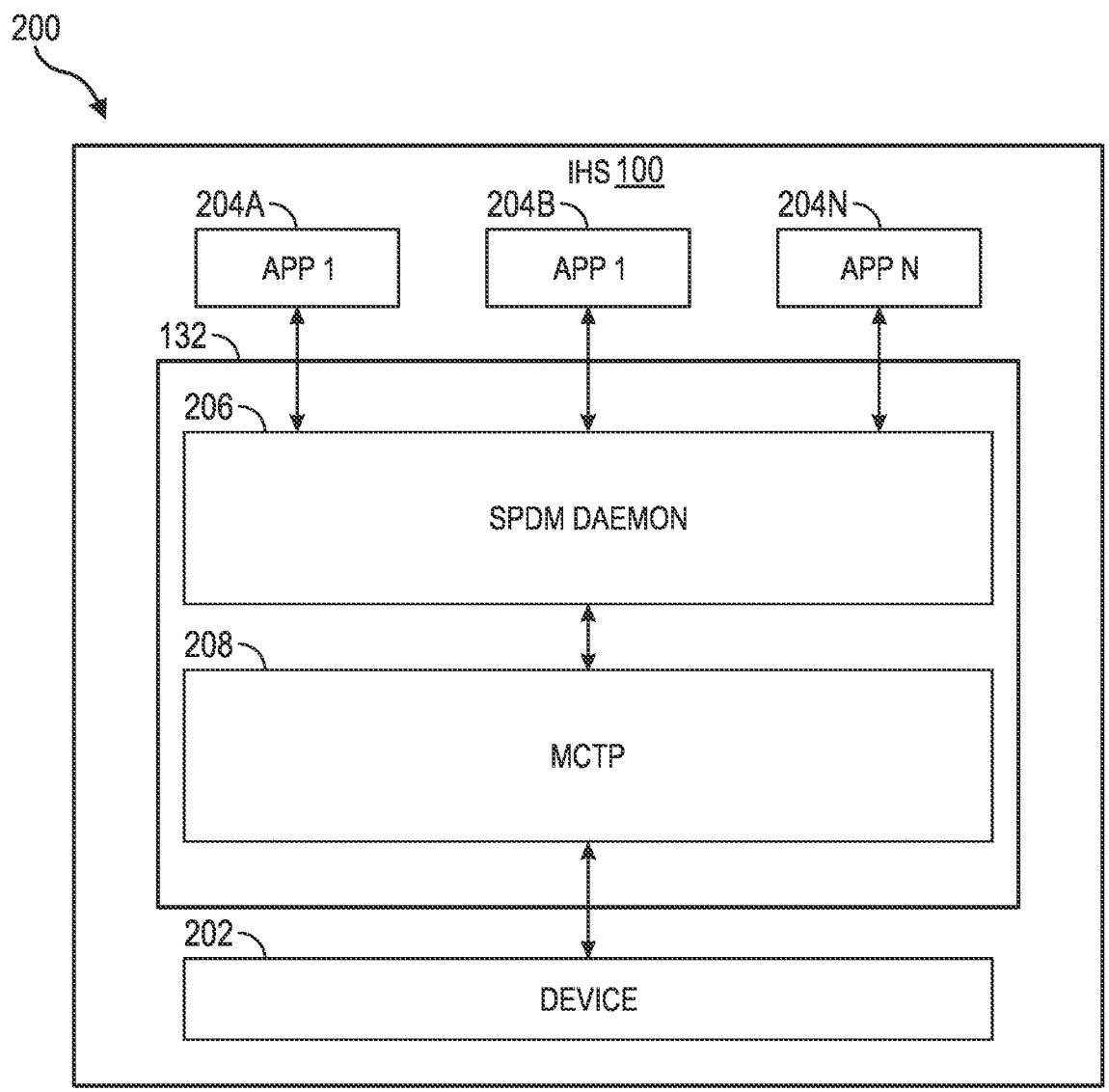
FIG. 2 illustrates an example SPDM secure communication session management system that may be used to manage multiple secure communication sessions with a SPDM-enabled device according to one embodiment of the present disclosure.

FIG. 2 illustrates an example SPDM secure communication session management system 200 that may be used to manage multiple secure communication sessions with a SPDM-enabled device 202 according to one embodiment of the present disclosure. The SPDM secure communication session management system 200 may be implemented, for example, in an IHS 100 configured with a BMC 132. In other embodiments, the SPDM secure communication session management system 200 may be implemented in any device or combination of devices for which management of multiple secure communication sessions may be needed or desired. In the present embodiment, the BMC 132 is configured with a SPDM daemon 206 that communicates with multiple apps 204 desiring to establish secure communication sessions with the SPDM-enabled device 202 through a MCTP layer 208 configured on the BMC 132.

Scenarios exist where multiple apps 204a-n (collectively 204) may desire to establish a secure communication session with the SPDM-enabled device 202. For example, a first application 204a may want to establish a secure communication session for the purpose of exchanging SEKM keys with the SPDM-enabled device 202, while a second application 204b may want to concurrently establish another secure communication session for performing RTCEM Pop. Additionally, a third application 204n may concurrently desire to establish a secure communication session for performing a PLDM firmware update. Many currently provided SPDM-enabled devices support multiple concurrent secure communication sessions, but some SPDM-enabled devices support more than others due to various reasons including cost and the nature and type of features supported by the vendor of the SPDM-enabled device. Additionally, the precise quantity of available secure communication sessions is often not known during runtime. According to embodiments of the present disclosure, SPDM daemon 206 includes executable logic for providing concurrent access to secure sessions with a SPDM-enabled device 202 according to the quantity of communication sessions supported by that SPDM-enabled device 202.

Figure 3:
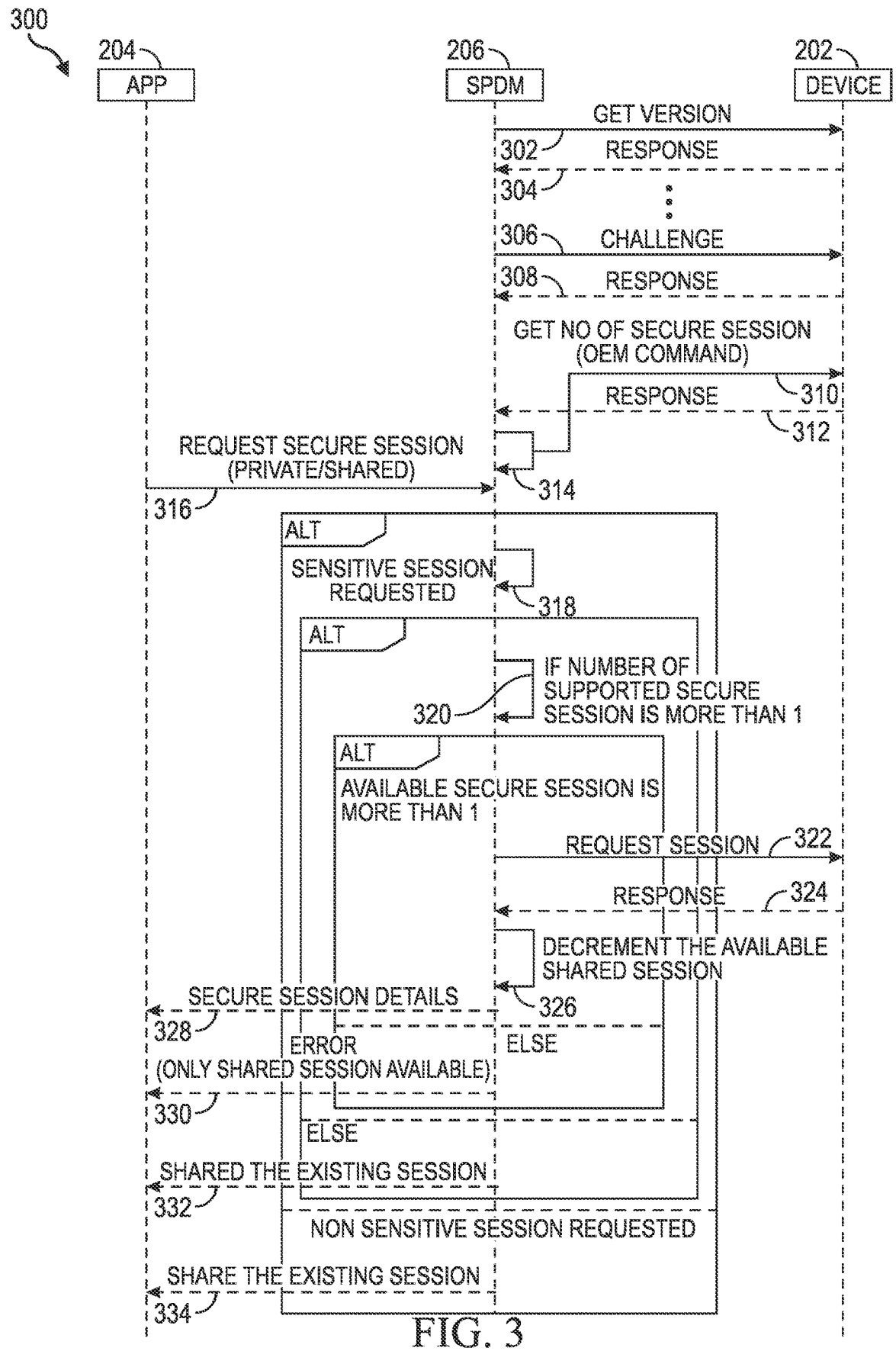
FIG. 3 illustrates a flow diagram showing one embodiment of an example SPDM secure communication session management method according to one embodiment of the present disclosure.

FIG. 3 illustrates a flow diagram showing one embodiment of an example SPDM secure communication session management method 300 according to one embodiment of the present disclosure. Additionally or alternatively, some, most, or all steps of the SPDM secure communication session management method 300 may be performed by the SPDM secure communication session management system 200 as described above with reference to FIG. 2. In one embodiment, the SPDM secure communication session management method 300 may be performed each time an application 204 issues a request to establish a communication session with the a SPDM-enabled device 202.

Initially at step 302, the SPDM daemon 206 issues a SPDM Get_Version request to the SPDM-enabled device 202, and at step 304, obtains a response to the Get_Version request. Thereafter at step 306, the SPDM daemon 206 issues a SPDM Challenge message to the SPDM-enabled device 202 and in response, obtains a response to the Challenge message at step 308. At this point, the SPDM-enabled device 202 is authenticated with the SPDM daemon 206 and as such, the SPDM daemon 206 may begin sharing secure information with the SPDM-enabled device 202.

At step 310, the SPDM daemon 206 issues a SPDM GetNoOfSecureSessions command to the SPDM-enabled device 202 and receives a response to the GetNoOfSecure-Sessions command that includes a value indicating the number or quantity of secure communication sessions supported by that SPDM-enabled device 202 at step 312. In one embodiment, the SPDM GetNoOfSecureSessions command may be a new OEM command that has heretofore not existed in the SPDM specification. The SPDM daemon 206 may then cache or persist the value in a down counter at step 314 for reasons that will be discussed herein below.

At step 316, the SPDM daemon 206 receives a request from the application 204 to establish a secure communication session with the SPDM-enabled device 202. In general, steps 316-330 describe actions that may be taken when the application 204 requests a private communication session with the SPDM-enabled device 202, while step 332 describes the action that may be taken when the application 204 requests a shared communication session. A shared communication session generally refers to a communication session that may be shared by multiple apps 204, thus allowing each application 204 access to the information sent to, and received by the other apps 204 using that shared communication session.

At step 318, the SPDM daemon 206 determines whether the number of supported communication sessions is more than one. For example, the SPDM daemon 206 may access the value obtained at step 312 to determine whether the SPDM-enabled device 202 would be capable of supporting an additional private communication session. Steps 320-330 describe actions that may be taken when the SPDM-enabled device 202 supports more than one (e.g., two or more) private communication sessions, while step 332 describes the actions that may be taken when the SPDM-enabled device 202 only supports one private communication session.

At step 320, the SPDM daemon 206 determines whether at least one private communication session is available. In one embodiment the SPDM daemon 206 may access the down counter to verify that at least one private communication session is available. In a particular embodiment in which the shared communication session comprises one of the supported communication sessions of the SPDM-enabled device 202, the SPDM daemon 206 may decrement the down counter by one after persisting the value of the number of secure communication sessions in the memory at step 314 to account for the use of one of the number of available communication sessions of the SPDM-enabled device 202 as the shared communication session. In one embodiment, the SPDM daemon 206 may be configured with logic to, when a previously established private communication session is terminated, increment the down counter by a value of one to indicate that the private communication session is available for use by another application 204. Steps 322-328 describe actions that may be taken when at least one private communication session is available, while step 330 describes the actions that may be taken when no private communication sessions is available.

At step 322, the SPDM daemon 206 issues a request for a private communication session from the SPDM-enabled device 202 and at step 324, receives a response to the request. The response, for example, may include information that will be used by the application 204 to establish the private communication session. At step 326, the SPDM daemon 206 decrements the down counter to indicate that the total number of available private communication sessions has been reduced by a value of one. Thereafter at step 328, the SPDM daemon 206 sends the private communication session information to the application 204. At this point, the application 204 may use the private communication session information to establish a private communication session with the SPDM-enabled device 202.

If, however, no private communication sessions are available (e.g., down counter has been decremented to zero), processing continues at step 330 in which the SPDM daemon 206 issues an error message to the application 204 indicating that no private communication sessions are available with the SPDM-enabled device 202. At this point, the application 204 may wait for a private communication session to become available, or request access to the shared communication session. When additional private communication sessions are not available with the SPDM-enabled device 202 (e.g., the total number of supported private communication session is not more than one), the SPDM daemon 206 may send information associated with the shared communication session so that the application 204 may communicate with the SPDM-enabled device 202 using the shared communication session at step 332. At step 334, the SPDM daemon 206 may send information associated with the shared communication session in the event that the application 204 requested access to the shared communication session.

The steps described above may be performed for each application 204 that requests to establish a secure communication session with the SPDM-enabled device 202. Nevertheless, when use of the SPDM secure communication session management method 300 is no longer needed or desired, the process ends.

Figure 4:
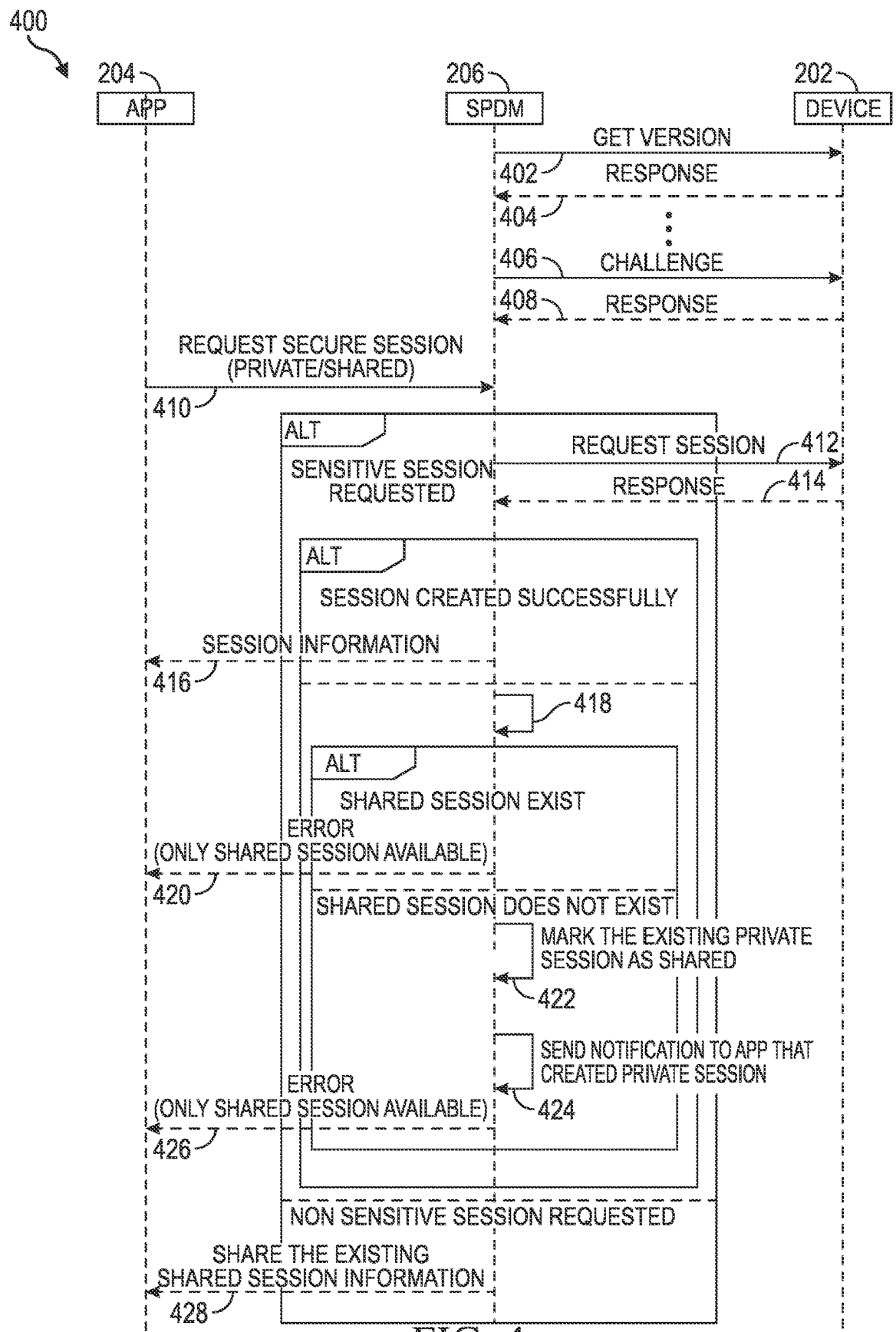
FIG. 4 illustrates a flow diagram showing one embodiment of another example SPDM secure communication session management method according to one embodiment of the present disclosure.

FIG. 4 illustrates a flow diagram showing one embodiment of another example SPDM secure communication session management method 400 according to one embodiment of the present disclosure. Whereas the SPDM secure communication session management method 300 of FIG. 3 uses a new OEM SPDM command (e.g., the GetNoOfSecureSessions command), the SPDM secure communication session management method 400 describes a technique for managing multiple secure communication sessions without the use of any dedicated OEM SPDM command. Some, most, or all steps of the SPDM secure communication session management method 400 may be performed by the SPDM secure communication session management system 400 as described above with reference to FIG. 2. In one embodiment, the SPDM timing requirements method 200 may be performed each time an application 204 issues a request to establish a communication session a SPDM-enabled device 202.

Initially at step 402, the SPDM daemon 206 issues a SPDM Get_Version request to the SPDM-enabled device 202, and at step 404, obtains a response to the Get_Version request. Thereafter at step 406, the SPDM daemon 206 issues a SPDM Challenge message to the SPDM-enabled device 202 and in response, obtains a response to the Challenge message at step 408. At this point, the SPDM-enabled device 202 is authenticated with the SPDM daemon 206 and as such, the SPDM daemon 206 may begin sharing secure information with the SPDM-enabled device 202. At step 410, the SPDM daemon 206 receives from an application 204, a request to establish a secure communication session with the SPDM-enabled device 202. In general, steps 412-424 describe actions that may be taken when the application 204 requests a secure communication session with the SPDM-enabled device 202, while step 426 describes the action that may be taken when the application 204 requests a shared communication session.

If the application 204 is requesting a private communication session, the SPDM daemon 206 issues a request for a private communication session from the SPDM-enabled device 202 at step 412 and at step 414, receives a response to the request. The response, for example, may include information that will be used by the application 204 to establish the private communication session. If the request is successful in that the SPDM-enabled device 202 allows the request, processing continues at step 416 in which the SPDM daemon 206 sends the private communication session information to the application 204. At this point, the application 204 may use the private communication session information to establish a private communication session with the SPDM-enabled device 202. If, however, the request was not successful, the SPDM daemon 206 may performs steps 418-424. The request may not be successful, for example, if the maximum amount of private communication sessions have already been established with the SPDM-enabled device 202.

At step 418, the SPDM daemon 206 determines whether a shared communication session exists for the SPDM-enabled device 202. If so, processing continues at step 420 in which it sends a message to the application 204 indicating that, while a private communication session is not available for use, a shared communication session is available. In one embodiment, the message may include information associated with the shared communication session that may be used by the application 204 to access the shared communication session. If, however, a shared communication does not exist, steps 422-426 may be performed to create the shared communication session.

At step 422, the SPDM daemon 206 marks an existing private communication session as a shared communication session, and at step 424, sends a notification to the application 204 that established the private communication session has been converted to a shared communication session.

Thereafter at step 426, the SPDM daemon 206 sends a message to the application 204 indicating that, while a private communication session is not available for use, a shared communication session is available. Step 428 is performed in the event that the application 204 did not make a request for a private communication session. As such, the SPDM daemon 206 sends a message to the application 204 that includes information associated with the shared communication session that may be used by the application 204 to access the shared communication session.

The steps described above may be performed for each application 204 that requests to establish a secure communication session with the SPDM-enabled device 202. Nevertheless, when use of the SPDM secure communication session management method 400 is no longer needed or desired, the process ends.

Although FIGS. 3 and 4 describe example methods 300 and 400 that may be performed to advertise an estimated response time to a requester, the features of the methods 300 and 400 may be embodied in other specific forms without deviating from the spirit and scope of the present disclosure. For example, either of the methods 300 and 400 may perform additional, fewer, or different operations than those described in the present examples. For another example, either of the methods 300 and 400 may be performed in a sequence of steps different from that described above. As yet another example, certain steps of either of the methods 300 and 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a Security Protocol and Data Model (SPDM)-enabled device conforming to a SPDM specification, wherein the SPDM-enabled device has a specified quantity of supported private communication sessions;
a processor; and
a memory coupled to the processor, the memory having program instructions stored thereon that, upon execution, cause the IHS to:
when an application requests use of one of the private communication sessions, to determine whether one of the private communication sessions is available;
obtain the quantity of private communication sessions from the SPDM-enabled device;
store the quantity in a down counter;
each time one of a plurality of the apps requests use of one of the private communication sessions, and when the down counter has a value of at least one:
enable the application to communicate with the SPDM-enabled device through the one private communication session; and
decrement the down counter; and
enable the application to communicate with the SPDM-enabled device through the one private communication session based on the determination.

2. The IHS of claim 1, wherein the program instructions, upon execution, further cause the IHS to, when the down counter has a value of zero, enable the application to establish a shared communication session with the SPDM-enabled device.

3. The IHS of claim 1, wherein the program instructions, upon execution, further cause the IHS to enable the application to communicate with the SPDM-enabled device by sending information associated with the one private communication session to the app.

4. The IHS of claim 1, wherein the program instructions, upon execution, further cause the IHS to obtain the quantity of private communication sessions from the SPDM-enabled device using an Original Equipment Manufacturer (OEM) command.

5. The IHS of claim 1, wherein the program instructions, upon execution, further cause the IHS to, when the application requests use of one of the private communication sessions,
attempt to establish the one communication session with the SPDM-enabled device; and
when the attempt is successful, enable the application to communicate with the SPDM-enabled device through the one private communication session.

6. The IHS of claim 5, wherein the program instructions, upon execution, further cause the IHS to, when the attempt is unsuccessful, enable the application to communicate with the SPDM-enabled device through a shared communication session.

7. The IHS of claim 6, wherein the program instructions, upon execution, further cause the IHS to, when the shared communication session does not exist, create the shared communication session by converting an existing private communication session into the shared communication session.

8. The IHS of claim 1, wherein the instructions are performed by a Baseboard Management Controller (BMC) configured in the IHS.

9. A Security Protocol and Data Model (SPDM) secure communication session management method comprising:
when an application requests use of one of a plurality of private communication sessions supported by a SPDM-enabled device, to determine whether one of the private communication sessions is available:
obtain the quantity of private communication sessions from the SPDM-enabled device;
store the quantity in a down counter;
each time one of a plurality of the apps requests use of one of the private communication sessions, and when the down counter has a value of at least one:
enable the application to communicate with the SPDM-enabled device through the one private communication session; and
decrement the down counter, wherein the SPDM-enabled device has a specified quantity of supported private communication sessions; and
enabling the application to communicate with the SPDM-enabled device through the one private communication session based on the determination.

10. The SPDM secure communication session management method of claim 9, further comprising, when the down counter has a value of zero, enabling the application to establish a shared communication session with the SPDM-enabled device.

11. The SPDM secure communication session management method of claim 9, further comprising enabling the application to communicate with the SPDM-enabled device by sending information associated with the one private communication session to the app.

12. The SPDM secure communication session management method of claim 9, further comprising wherein the program instructions, upon execution, further cause the SPDM secure communication session management to obtain the quantity of private communication sessions from the SPDM-enabled device using an Original Equipment Manufacturer (OEM) command.

13. The SPDM secure communication session management method of claim 9, further comprising, when the application requests use of one of the private communication sessions:
attempting to establish the one communication session with the SPDM-enabled device; and
when the attempt is successful, enabling the application to communicate with the SPDM-enabled device through the one private communication session.

14. The SPDM secure communication session management method of claim 13, further comprising, when the attempt is unsuccessful, enabling the application to communicate with the SPDM-enabled device through a shared communication session.

15. The SPDM secure communication session management method of claim 14, further comprising, when the shared communication session does not exist, create the shared communication session by converting an existing private communication session into the shared communication session.

16. A computer program product comprising a computer readable storage medium having program instructions stored thereon that, upon execution by an Information Handling System (IHS), cause the IHS to:
when an application requests use of one of a plurality of private communication sessions supported by a Security Protocol and Data Model (SPDM)-enabled device, to determine whether one of the private communication sessions is available:
obtain the quantity of private communication sessions from the SPDM-enabled device;
store the quantity in a down counter;
each time one of a plurality of the apps requests use of one of the private communication sessions, and when the down counter has a value of at least one:
enable the application to communicate with the SPDM-enabled device through the one private communication session; and
decrement the down counter; and
enable the application to communicate with the SPDM-enabled device through the one private communication session based on the determination.

17. The computer program product of claim 16, wherein the program instructions, upon execution, further cause the IHS to, when the application requests use of one of the private communication sessions,
attempt to establish the one communication session with the SPDM-enabled device; and
when the attempt is successful, enable the application to communicate with the SPDM-enabled device through the one private communication session; and
when the attempt is unsuccessful, enable the application to communicate with the SPDM-enabled device through a shared communication session.

\* \* \* \* \*